(12) United States Patent
Shimo (10) Patent No.: US 10,519,976 B2
(45) Date of Patent: Dec. 31, 2019

(54) FLUID DIODES WITH RIDGES TO CONTROL BOUNDARY LAYER IN AXIAL COMPRESSOR STATOR VANE

(71) Applicant: Rolls-Royce Corporation, Indianapolis, IN (US)

(72) Inventor: Masayoshi Shimo, Carmel, IN (US)

(73) Assignee: ROLLS-ROYCE CORPORATION, Indianapolis, IN (US)

(*) Notice: Subject to any disclaimer, the term of this patent is extended or adjusted under 35 U.S.C. 154(b) by 426 days.

(21) Appl. No.: 15/401,953

(22) Filed: Jan. 9, 2017

(65) Prior Publication Data

US 2018/0195528 A1 Jul. 12, 2018

(51) Int. Cl.
| | |
|---|---|
| *F04D 29/54* | (2006.01) |
| *F04D 29/52* | (2006.01) |
| *F04D 27/00* | (2006.01) |
| *F04D 29/32* | (2006.01) |
| *F02K 3/06* | (2006.01) |
| *F02C 7/04* | (2006.01) |

(52) U.S. Cl.
CPC .............. *F04D 29/544* (2013.01); *F02C 7/04* (2013.01); *F02K 3/06* (2013.01); *F04D 27/009* (2013.01); *F04D 29/325* (2013.01); *F04D 29/522* (2013.01); *F05D 2240/124* (2013.01)

(58) Field of Classification Search
CPC .... F04D 29/544; F04D 27/009; F04D 29/522; F04D 29/325; F04D 29/38; F04D 29/384; F01D 5/146; F01D 1/145; F02K 3/06; F02C 7/04; Y02T 50/673

USPC .......... 416/223 R, 235, 231 R; 415/119, 914
See application file for complete search history.

(56) References Cited

U.S. PATENT DOCUMENTS

| | | | | |
|---|---|---|---|---|
| 634,885 | A * | 10/1899 | Glover | F01D 5/145 |
| | | | | 416/231 R |
| 1,012,308 | A * | 12/1911 | Weiland | B64C 11/24 |
| | | | | 416/91 |
| 1,066,988 | A * | 7/1913 | Boutwell | F01D 5/145 |
| | | | | 416/231 R |
| 1,862,827 | A * | 6/1932 | Carnegie | F01D 5/141 |
| | | | | 416/224 |
| 2,135,887 | A * | 11/1938 | Fairey | B64C 11/16 |
| | | | | 416/23 |
| 2,166,823 | A * | 7/1939 | Rosenlocher | F01D 5/145 |
| | | | | 415/208.1 |

(Continued)

FOREIGN PATENT DOCUMENTS

| | | | | |
|---|---|---|---|---|
| DE | 7907797 | U1 * | 3/1980 | F04D 29/68 |
| DE | 3505823 | A1 * | 8/1986 | F01D 5/145 |

(Continued)

*Primary Examiner* — J. Todd Newton
(74) *Attorney, Agent, or Firm* — Duane Morris LLP; Patrick Craig Muldoon (57) ABSTRACT

An entrance stator in a turbofan has an airfoil shape with a leading edge and a trailing edge connected by surfaces which define a suction side and a pressure side. The entrance stator has a channel with an opening on the pressure side, extending to an exit on the suction side, having a pressure gradient between the opening and the exit. The channels are preceded with a ridge. The channels and the ridges control the boundary layer, enabling higher efficiencies. The channels and ridges add energy to the boundary layer to prevent separation.

20 Claims, 7 Drawing Sheets

(56) References Cited

U.S. PATENT DOCUMENTS

| | | | | |
|---|---|---|---|---|
| 2,283,068 A * | 5/1942 | Johnson | | B64C 11/16 416/91 |
| 2,340,417 A * | 2/1944 | Ellett | | B64C 11/16 416/231 R |
| RE23,108 E | 5/1949 | Stalker | | |
| 2,637,487 A * | 5/1953 | Sawyer | | F04D 29/681 415/115 |
| 2,720,356 A | 10/1955 | Erwin | | |
| 2,749,025 A | 6/1956 | Stalker | | |
| 2,859,910 A * | 11/1958 | Stalker | | F04D 29/682 415/115 |
| 3,385,509 A | 5/1968 | Garnier | | |
| 3,581,569 A * | 6/1971 | Black | | G01K 11/22 60/803 |
| 3,694,102 A | 9/1972 | Conrad | | |
| 3,749,520 A * | 7/1973 | Bandukwalla | | F04D 29/30 415/218.1 |
| 3,897,168 A | 7/1975 | Amos | | |
| 3,993,414 A | 11/1976 | Meauze et al. | | |
| 4,102,600 A * | 7/1978 | Schwab | | F01D 5/145 416/231 R |
| 4,595,339 A | 6/1986 | Naudet | | |
| 4,714,408 A * | 12/1987 | Abe | | F04D 29/38 416/231 R |
| 4,822,249 A * | 4/1989 | Eckardt | | F01D 5/145 416/235 |
| 4,869,644 A * | 9/1989 | Takigawa | | F04D 29/38 416/235 |
| 5,540,406 A * | 7/1996 | Occhipinti | | B63B 1/248 244/198 |
| 5,651,662 A * | 7/1997 | Lee | | F01D 5/186 416/95 |
| 5,660,525 A * | 8/1997 | Lee | | F01D 5/186 416/96 R |
| 6,354,804 B1 * | 3/2002 | Leung | | B63H 1/28 416/231 R |
| 7,878,759 B2 * | 2/2011 | Mills | | F01D 5/145 416/1 |
| 8,425,190 B2 * | 4/2013 | Wu | | F03D 1/0675 415/914 |
| 8,651,813 B2 * | 2/2014 | Long | | B63B 35/7926 416/90 A |
| 10,100,659 B2 * | 10/2018 | Lamusga | | F01D 11/08 |
| 10,107,104 B2 * | 10/2018 | Bloxham | | F01D 5/145 |
| 10,280,757 B2 * | 5/2019 | Kupratis | | F01D 5/146 |
| 2001/0036401 A1 * | 11/2001 | Harvey | | F01D 5/145 415/115 |
| 2003/0150962 A1 * | 8/2003 | Orban | | B64C 21/025 244/209 |
| 2004/0213661 A1 * | 10/2004 | Sekularac | | F01D 5/048 415/1 |
| 2005/0081530 A1 * | 4/2005 | Bagnall | | B64C 21/06 60/785 |
| 2005/0147497 A1 * | 7/2005 | Doerffer | | F01D 5/145 416/231 R |
| 2007/0274823 A1 * | 11/2007 | Borchers | | F01D 5/148 415/115 |
| 2009/0003989 A1 * | 1/2009 | Guemmer | | F01D 5/145 415/115 |
| 2009/0136354 A1 * | 5/2009 | Takahashi | | F01D 5/145 416/223 R |
| 2009/0220332 A1 * | 9/2009 | Tsuchiya | | F01D 5/145 415/115 |
| 2010/0014983 A1 * | 1/2010 | Takahashi | | F01D 5/145 416/241 R |
| 2010/0239412 A1 * | 9/2010 | Draper | | F01D 5/186 415/115 |
| 2010/0266385 A1 * | 10/2010 | Praisner | | F01D 5/145 415/115 |
| 2010/0329848 A1 * | 12/2010 | Harvey | | F01D 5/145 415/115 |
| 2011/0052373 A1 * | 3/2011 | Sparks | | F01D 5/145 415/115 |
| 2011/0182746 A1 * | 7/2011 | Fiala | | F01D 5/145 416/235 |
| 2011/0200442 A1 * | 8/2011 | Routier | | F01D 5/141 416/223 A |
| 2011/0229322 A1 * | 9/2011 | Tadayon | | F03D 1/065 416/91 |
| 2012/0009065 A1 * | 1/2012 | Harvey | | F01D 5/145 416/91 |
| 2012/0315136 A1 * | 12/2012 | Sonoda | | F04D 29/526 415/210.1 |
| 2013/0287579 A1 * | 10/2013 | Huebner | | F01D 5/145 416/223 A |
| 2014/0178187 A1 * | 6/2014 | Sakekar | | F02C 7/00 415/185 |
| 2014/0215998 A1 * | 8/2014 | Goswami | | F04D 29/384 60/39.1 |
| 2015/0050146 A1 * | 2/2015 | Dorweiler | | F03B 3/121 416/1 |
| 2016/0052621 A1 * | 2/2016 | Ireland | | B64C 21/04 137/13 |
| 2016/0245091 A1 * | 8/2016 | Kupratis | | F01D 5/146 |
| 2016/0251966 A1 * | 9/2016 | Bunker | | F01D 5/145 416/97 R |
| 2017/0176012 A1 * | 6/2017 | Lacy | | F02C 3/04 |
| 2017/0218774 A1 * | 8/2017 | Bloxham | | F01D 5/145 |
| 2018/0195528 A1 * | 7/2018 | Shimo | | F04D 29/544 |
| 2018/0283180 A1 * | 10/2018 | Jain | | B64C 11/16 |

FOREIGN PATENT DOCUMENTS

| | | | | |
|---|---|---|---|---|
| EP | 2463480 A2 * | 6/2012 | | F01D 5/145 |
| WO | WO-2005040559 A1 * | 5/2005 | | F01D 5/146 |

* cited by examiner

FLUID DIODES WITH RIDGES TO CONTROL BOUNDARY LAYER IN AXIAL COMPRESSOR STATOR VANE

BACKGROUND

Fluid propulsion devices achieve thrust by imparting momentum to a fluid called the propellant. An air-breathing engine, as the name implies, uses the atmosphere for most of its propellant. The gas turbine produces high-temperature gas which may be used either to generate power for a propeller, fan, generator or other mechanical apparatus or to develop thrust directly by expansion and acceleration of the hot gas in a nozzle. In any case, an air breathing engine continuously draws air from the atmosphere, compresses it, adds energy in the form of heat, and then expands it in order to convert the added energy to shaft work or jet kinetic energy. Thus, in addition to acting as propellant, the air acts as the working fluid in a thermodynamic process in which a fraction of the energy is made available for propulsive purposes or work.

Typically turbofan engines include at least two air streams. All air utilized by the engine initially passes through a fan, and then it is split into the two air streams. The inner air stream is referred to as core air and passes into the compressor portion of the engine, where it is compressed. This air then is fed to the combustor portion of the engine where it is mixed with fuel and the fuel is combusted. The combustion gases are then expanded through the turbine portion of the engine, which extracts energy from the hot combustion gases, the extracted energy being used to run the compressor, the fan and other accessory systems. The remaining hot gases then flow into the exhaust portion of the engine, which may be used to produce thrust for forward motion to the aircraft.

Figure 1:
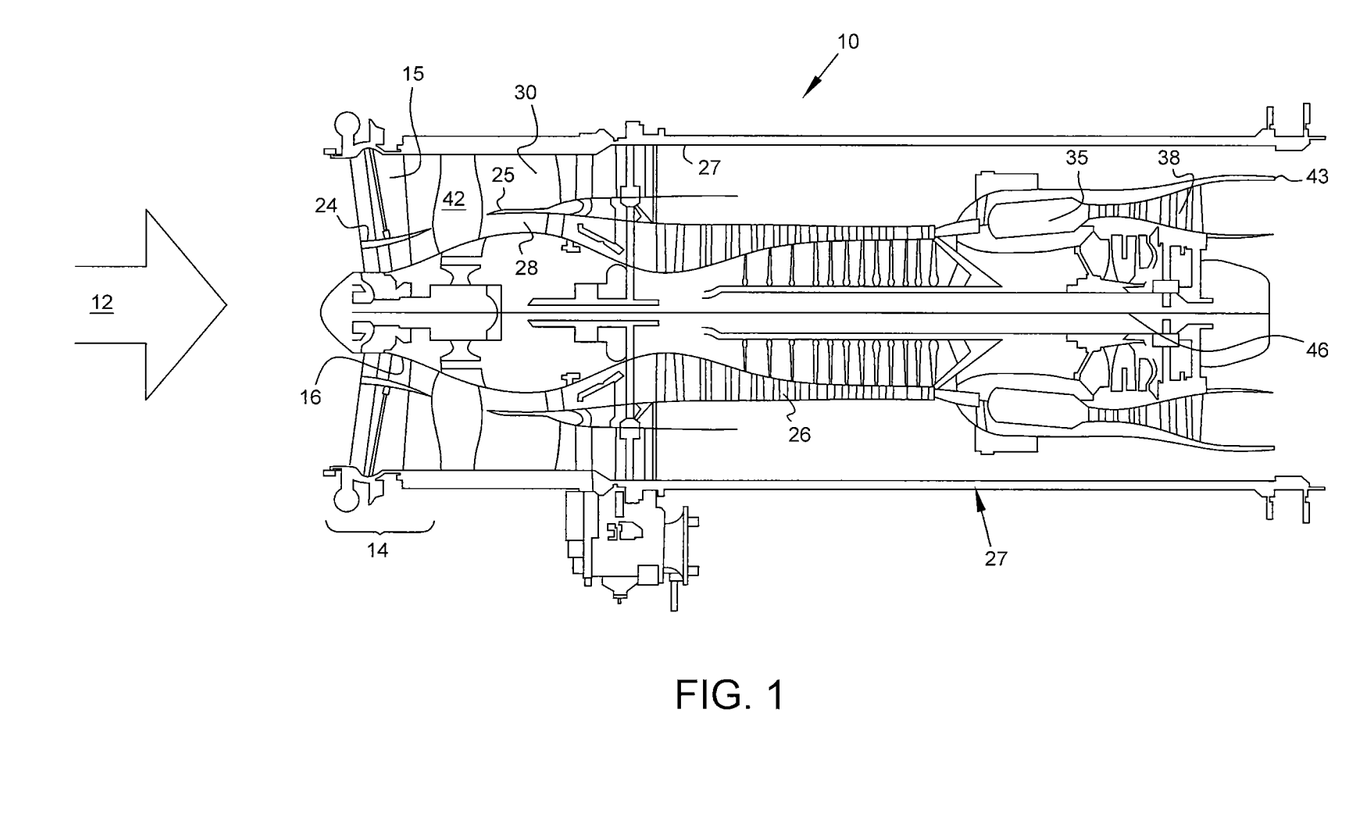
FIG. 1 is an illustration of a turbofan engine.

In the turbofan engine shown in FIG. 1, the flow of the air is generally axial. The engine direction along the axis is generally defined using the terms "upstream" and "downstream" generally which refer to a position in a jet engine in relation to the ambient air inlet and the engine exhaust at the back of the engine. For example, the inlet fan is upstream of the combustion chamber. Likewise, the terms "fore" and "aft" generally refer to a position in relation to the ambient air inlet and the engine exhaust nozzle. Additionally, outward/outboard and inward/inboard refer to the radial direction. For example, the bypass duct is outboard the core duct. The ducts are generally circular and co-axial with each other.

As ambient inlet airflow 12 enters inlet fan duct 14 of turbofan engine 10, the air passes through the guide vanes 15, by fan spinner 16, and through fan rotor (fan blade) 42. The airflow 12 is split into primary (core) flow stream 28 and bypass flow stream 30 by upstream splitter 24 and downstream splitter 25.

Figure 2:
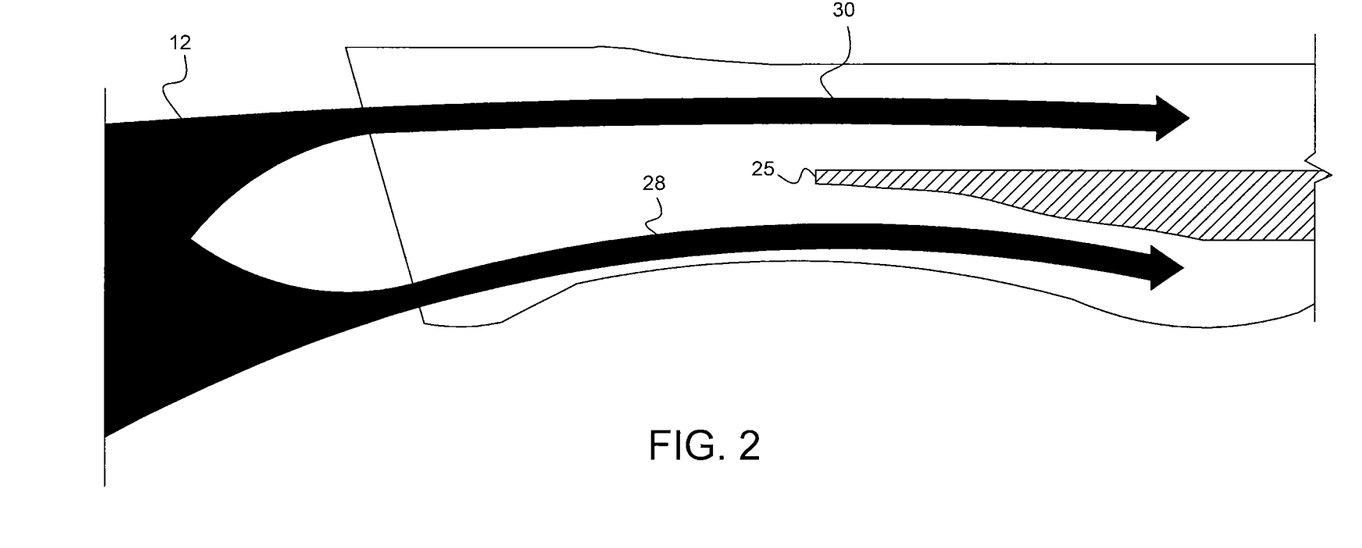
FIG. 2 is an illustration of the core and bypass flow streams.

In FIG. 2, the bypass flow stream 30 along with the core/primary flow stream 28 is shown, the bypass stream 30 being outboard of the core stream 28. The inward portion of the bypass steam 30 and the outward portion of the core stream 28 are partially defined by the splitters upstream of the compressor 26. The fan 42 has a plurality of fan blades.

As shown in FIG. 1 the fan blade 42 is rotating about the engine axis into the page, therefor the low pressure side of the blade 42 is shown, the high pressure side being on the opposite side. The primary flow (core) stream 28 flows through compressor 26 that compresses the air to a higher pressure. The core flow stream 28 is then mixed with fuel in combustion chamber 35 and the mixture is ignited and burned. The resultant combustion products flow through turbines 38 that extract energy from the combustion gases to turn fan rotor 42, compressor 26 and any shaft work by way of turbine shaft 40. The gases, passing through the exhaust cone, expand through an exhaust nozzle 43 to produce thrust. Primary flow stream 28 leaves the engine at a higher velocity than when it entered. Bypass flow stream 30 flows through fan rotor 42, flows by bypass duct outer wall 27 (an annular duct concentric with the core engine), flows through fan discharge outlet, and is expanded through an exhaust nozzle to produce additional thrust. Turbofan engine 10 has a generally longitudinally extending centerline represented by engine axis 40.

Current compressor design relies on conventional airfoils, borrowed from aircraft wing theory, disposed in an annular duct. The design of both low- and high-subsonic airfoils in modern, axial-flow compressors has remained essentially the same since the mid-1980's when Hobbs and Weingold published their work on what is now known as the controlled-diffusion airfoil. Improvements in the performance of low- and high-subsonic axial-flow compressors having controlled-diffusion airfoils have been realized by optimizing the solidity, aspect-ratio, and three dimensional stacking of these airfoil sections leading to loss-reduction and increasing the operable incidence range. Further performance improvements have been realized by minimizing the blade-tip and stator shroud clearances, leakage paths, and bleed flows that can disrupt the flow in the blade rows. Finally, improvements to simulation tools have allowed designers to more accurately set the stage-matching of blade rows.

As the above approaches to improve airfoil performance have matured, it has become increasingly difficult to attain further improvements for modern, axial-flow compressors. State-of-the-art compressor technology has continued to show an asymptotic trend in performance.

Despite the design limitations of conventional compressors, the demand to increase compressor performance, and thereby reduce engine fuel consumption, remains high. There remains a need to minimize aerodynamic losses and increase the incidence-range of axial-flow compressor blading to reduce specific fuel consumption and improve the operating range of the attendant blading.

The purpose of the boundary layer control, also known as BLC, is to affect the flow by influencing the structure of the boundary layer, in order to increase the efficiency, the loading and the stage pressure ratio of turbo engines, and of design performance of isolated airfoils and bodies. The main advantage of boundary layer control discussed herein is to prevent or delay boundary layer separation and thereby increase the allowable blade or airfoil loading and range of angles of attack.

The application of flow control to axial-compressor blade/vane row design allows an increase in blade/vane loading levels and a broadened operating range. In particular, the increase in loading of blade/vane rows results in fewer blades/vanes and/or stages used for the same magnitude of flow turning and compressor pressure ratio respectively. The reduction in parts count yields a reduction in wetted area, reduced maintenance and reduced total weight of the compressor.

Fluid dynamics have been considered for a substantial period of time. One of the arts in which substantial and powerful thought has been devoted to is that of compressors and turbomachines. One of the most important areas driving such research is aeronautics and astronautics for both the commercial interests of high speed transportation and military interests for defense and the exploration of space. Some important issues with respect to the advance of compressors and turbomachines is the attainable pressure ratio and the efficiency of the machines.

Reissue U.S. Pat. No. 23,108 to E. A. Stalker discloses the provision of slots located well rearward on the blade to increase the effectiveness of the blade. This is taught in order to control the boundary layer on the blades of blowers and compressors to better enable the machine to run at lower than optimal speeds.

J. R. Irwin, U.S. Pat. No. 2,720,356 imposes continuous boundary layer control for compressors by moving the boundary layer through porous surfaces. The teaching recommends to then reintroduce the viscous interactive flow to the main flow of the compressor at a later stage.

U.S. Pat. No. 2,749,025 to Stalker focuses primarily on providing blades of later stages in a compressor with progressively larger radii rounded leading edges. This reduces losses associated with the flow angle into these blades which would normally be experienced at below optimum speeds. The substantially semi-circular nose cross-section is professed to be able to smooth the flow and avoid burbling when the approach vectors are far from optimum. A further step to assist the machine in these conditions is to remove the boundary layer in this area.

U.S. Pat. No. 3,694,102 to Conrad teaches use of suction slots in stator blades to prevent separation of the boundary layer in supersonic blading. Conrad, however, fails to recognize the benefit of removing the boundary layer permanently from a compressor. This is evidenced by equating bleeding of the boundary layer to atmosphere to reintroducing the boundary layer into the compressor at another stage.

U.S. Pat. No. 3,993,414 to Meauze discloses an axial supersonic compressor comprising a casing and a hub rotating in the casing and carrying blades. On each of the suction surfaces of the blades is formed a zone in which the curvative changes and which corresponds to a supersonic shock wave. A channel formed in each blade and opening in the zone is connected to a boundary layer aspiration means.

U.S. Pat. No. 3,897,168 to Amos and U.S. Pat. No. 4,595,339 to Naudet both disclose the recapture of energy from a withdrawn boundary layer to avoid losses.

U.S. Pat. No. 3,385,509 to Gamier discloses an engine with counter-rotating compressor blades and counter-rotating turbine blades. Nozzle flow area of the turbines is adjusted to control the boundary layer by either moving the stators or by blowing through slots in their surfaces. Gamier is silent however on removing the boundary layer from the flow permanently.

SUMMARY

The present application discloses one or more of the features recited in the appended claims and/or the following features which, alone or in any combination, may comprise patentable subject matter.

An embodiment of the disclosed subject matter describes a turbofan having a main passage; a fan in the main passage, the main passage separating into a bypass passage and core passage downstream of the fan; the core passage having an entrance proximate to the fan and an outlet downstream of a compressor; an entrance stator located within the core passage aft of the entrance and forward of the compressor; the entrance stator fixed to an inner casing and an outer casing, the entrance stator extending radially between the inner and outer casing; the outer casing separating the bypass passage from the core passage; the entrance stator having an airfoil shape with a leading edge and a trailing edge connected by surfaces which define suction side and a pressure side. The embodiment also includes the entrance stator having a channel with an opening on the pressure side, the channel extending from the opening to an exit on the suction side, with a pressure gradient between the opening and the exit.

In some embodiments the exit of the channel is located proximate the inner casing, wherein the inner and outer casing are co-axial.

In some embodiments the exit of the channel extends radially from the inner casing to less than a third of the stator span.

In some embodiments the exit of the channel is located forward of the half chord of the entrance stator.

In some embodiments the exit of the channel is located aft of the half chord of the entrance stator.

Some embodiments further comprise a ridge located on the surface of the suction side, adjacent and forward of the channel exit, the ridge extending into the core passage.

In some embodiments the entrance stator comprises of a second channel, the second channel with a second opening on the pressure side and a second exit on the suction side.

In some embodiments the exit is polygonal with at least one side perpendicular to a predetermined flow proximate to the exit.

In some embodiments the size of the opening is greater than exit.

Other embodiments of the disclosed subject matter present a turbofan with a plurality of stators between the fan and rotor of a compressor wherein the fan and compressor rotor are coaxial, each stator having a leading edge, trailing edge, suction surface and pressure surface, the suction and pressure surfaces extending between the leading and trailing edge. A method of increasing the efficiency of the compressor comprises injecting high pressure air from the pressure surface via a passage between the pressure surface and the suction surface into a boundary layer on the suction surface, restricting the flow of fluid from the suction surface through the passage towards the pressure surface; tripping the fluid flow proximate a boundary layer on the suction surface from laminar to turbulent on the suction surface upstream of the injected high pressure air to turbulent upstream of the high pressure air injection, thereby increasing the efficiency of the compressor.

In some embodiments the method further comprises exposing the passage to the high pressure fluid proximate the surface forward of the half chord of each of the plurality of stators.

In some embodiments the passage exits the suction surface aft of the half chord of the stator.

In some embodiments the step of tripping the air flow comprises positioning a ridge on the suction surface forward of the passage and extending the ridge into the air flow.

In some embodiments the passage comprises multiple passages.

In some embodiments the method further comprises positioning the passage's exit proximate to a predetermined fluid flow detachment region on the suction surface.

In some embodiments the method further comprises positioning the passage on the pressure surface at region where the fluid proximate the region creates a pressure gradient to drive the fluid to the suction surface.

Yet further embodiments of the disclosed subject matter include a stator vane having a leading edge, a trailing edge, a first surface from the leading edge to the trailing edge and a second surface oppositely disposed from the first surface extending from the trailing edge to the leading edge in the shape of an aerofoil; a one way channel with an opening on the first surface, the one way channel extending from the opening to an exit on the second surface, a pressure gradient between the opening and the exit of the one way channel; and, a ridge extending from the second surface forward of the exit, proximate to the opening and exit; wherein the first surface is in fluid communication via the one way channel with the second surface.

In some embodiments the exit is polygonal and at least one of the sides extends along the span of the vane.

Some embodiments further comprise a second one-way channel with a second opening on the first side, the second one-way channel extending from the second opening to a second exit on the second surface.

In some embodiments first and second exits are positioned in an area predetermined to have low momentum flow.

The aforementioned features enable one or more of the following advantages: increased vane loading; increased incidence range and hence an increase in compressor operating range; increased blade/vane row efficiency; reduced solidity and hence wetted area, parts count and weight; reduced total-core or primary flow loss; reduced trailing-edge mixing loss; and reduced bleed mass flow rate and hence low system impact.

These and many other advantages of the present subject matter will be readily apparent to one skilled in the art to which the invention pertains from a perusal of the claims, the appended drawings, and the following detailed description of preferred embodiments.

DETAILED DESCRIPTION

Figure 3:
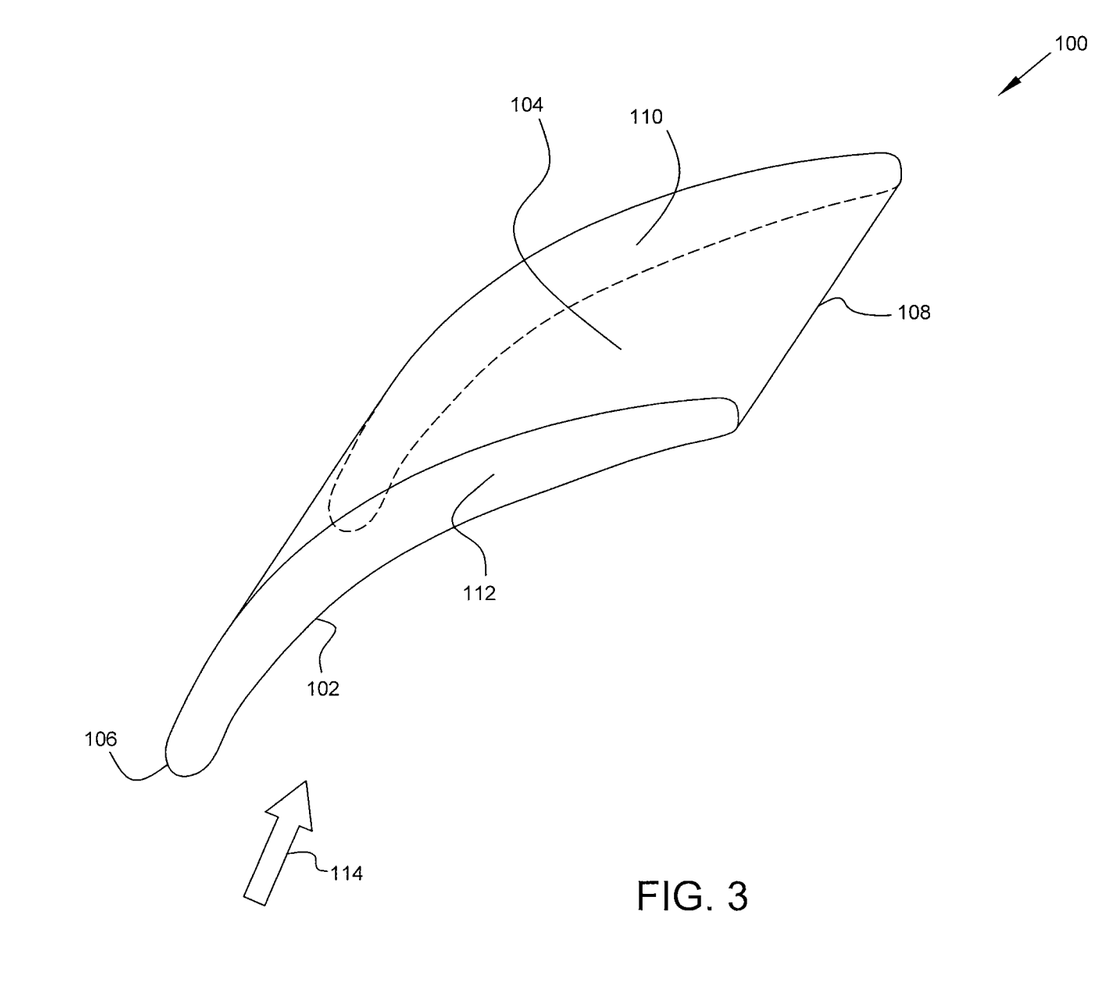
FIG. 3 is an illustration of a conventional stator vane.

In accordance with some embodiments of the present disclosure, a prospective view of a stator vane 100 is illustrated in FIG. 3. The blade 100 may comprise a high pressure surface 102 (pressure side), and a low pressure surface 104 (suction side). The high and low pressure surfaces 102, 104 may be connected by a leading edge 106 and a trailing edge 108 and expand in a span wise direction between a first end 110 and a second end 112. The localized flow is shown as arrow 114. The vane 100 while described with respect to a stator blade may also be applicable to a compressor rotor. The vane 100 may be one of a plurality of vanes in a gas turbine compressor.

The purpose of a stator vane in an axial compressor is to reduce absolute velocity across stages, increasing static pressure at the inlet of the combustor and providing a proper incident angle to the subsequent rotor. Typical inlet Mach number at the inlet of combustor is around 0.1, difficult to be achieved efficiently by a short diffuser alone attached to the exit of an axial compressor. The higher the overall pressure ratio and inlet mass flow rate processed by the machine, the higher the number of axial compressor stages (i.e., the number of stator vanes) to achieve the purpose efficiently.

This effect is called adverse pressure gradient flow field, where static pressure continuously increases by reducing the absolute velocity leading to boundary layer separation. When the boundary layer is separated from the vane surface, momentum loss is initiated leading to total pressure loss and heat production (i.e., entropy production). This is a major source of loss in compressor aerodynamic performance, potentially leading to compressor surge in extreme situations. The boundary layer separation is commonly observed on suction side 104 of a stator vane 100 at high positive incidence or an engine section stator (ESS) vane 400 located at the inlet of descending flow path 428 of the core flow 28 for compressors as shown in FIG. 4.

In particular, an ESS 400 in general has to deal with the highest inlet Mach number (e.g., up to 0.9 in Mach number) with higher swirl angles from the fan root flow which tends to have higher loading (i.e., diffusion factor) due to its flow deceleration with nearly zero swirl angles (e.g., around 0.5 in Mach number). The entrance to the core passage 28 as shown is just aft of the fan 42 and forward of the compressor 26. The pre-fan flow in the main passage is represented as arrow 412.

Figure 4:
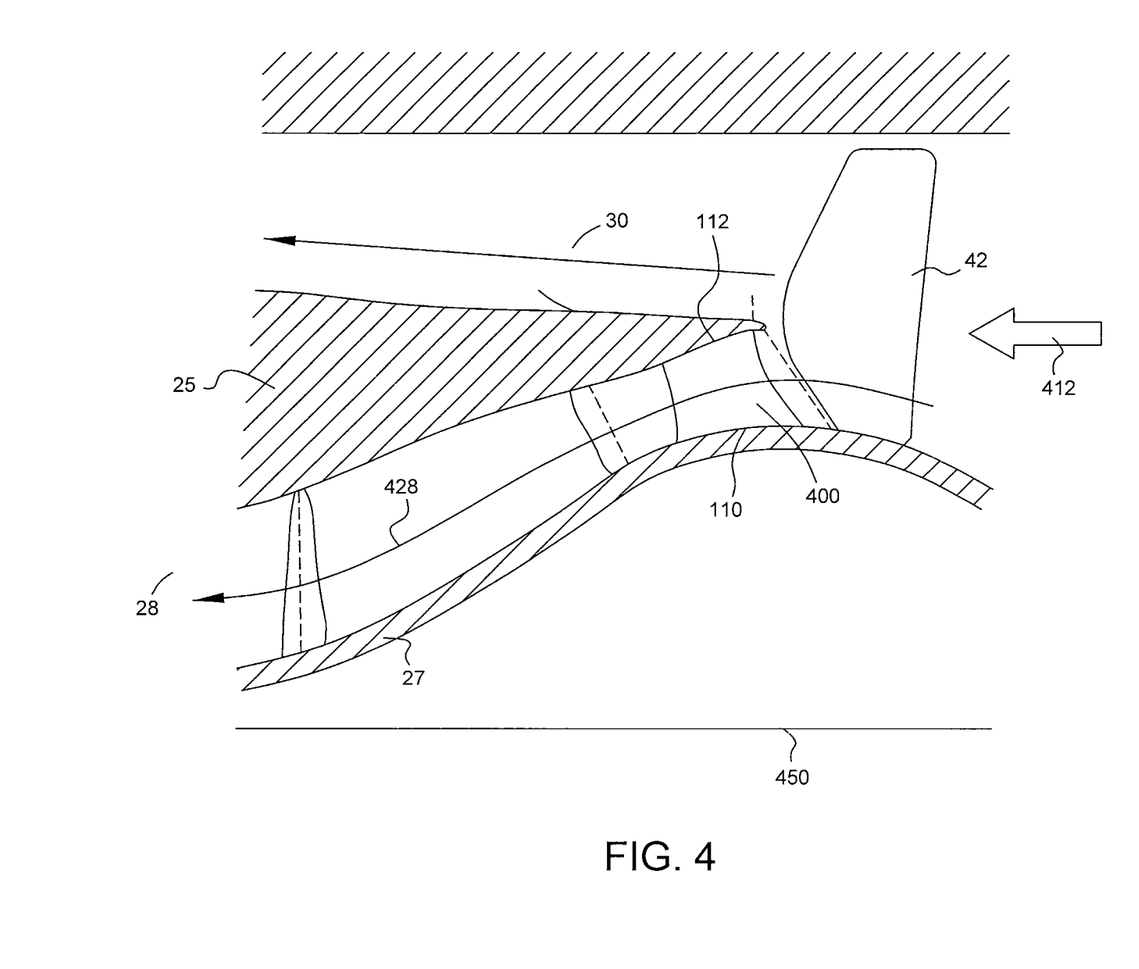
FIG. 4 is an illustration of an engine section stator and core passage according to an embodiment of the disclosed subject matter.

As shown in FIG. 4, the vane 400 is fixed to an inner casing 27 and splitter 25 (outer casing). The stator extends radially between the casings, typically the inner casing 27 and the splitter are co-axial about the shaft.

Figure 5A:
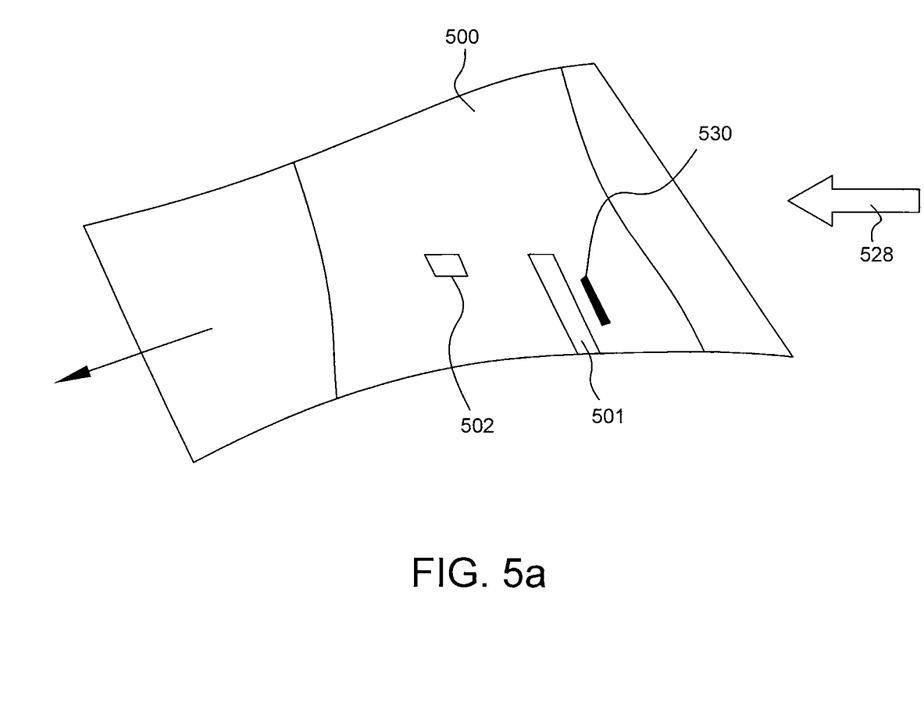
FIGS. 5a and 5b are a side and top view of a vane according to an embodiment of the disclosed subject matter.
Figure 5B:
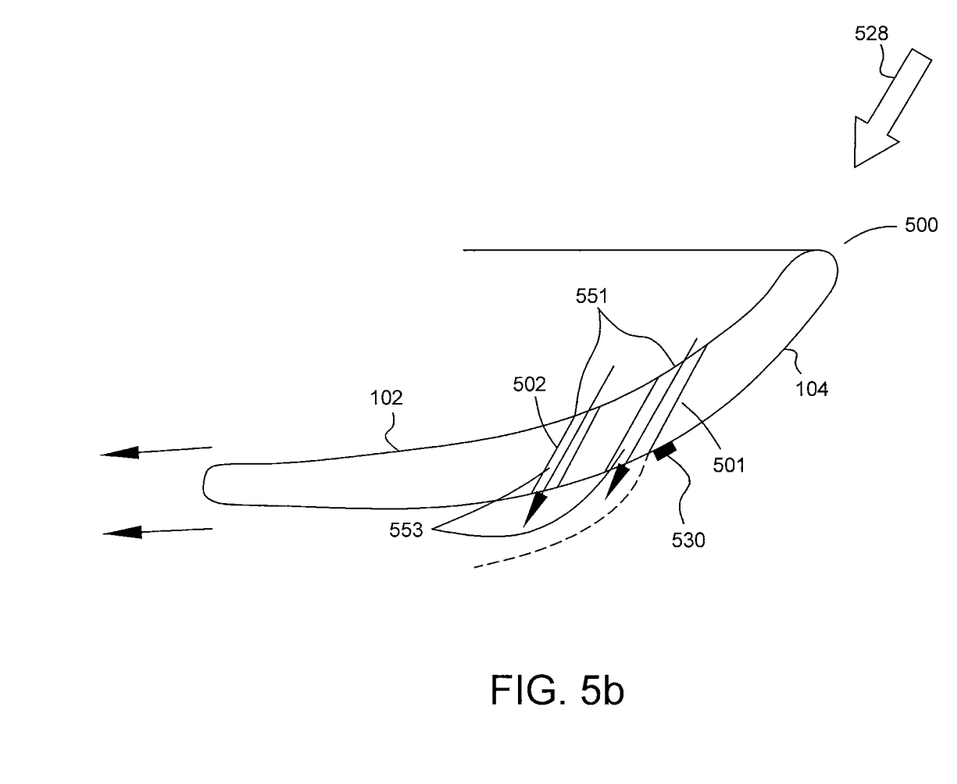

FIGS. 5a and 5b illustrate an airfoil shaped vane 500 equipped with a first slot 501 and a second slot 502 with a ridge 530 to control the boundary layer on the suction side of the vane 500. While FIGS. 5a and 5b illustrate two slots, and a single ridge, embodiments are envisioned with multiple or a single slot and with plural or single ridges. The amount of flow through the slots is driven by the slot discharge coefficient and delta static pressure between pressure 102 and suction sides 104 as shown in FIG. 5b. The direction of the core flow is shown as 528 in FIGS. 5a and 5b.

Figure 6:
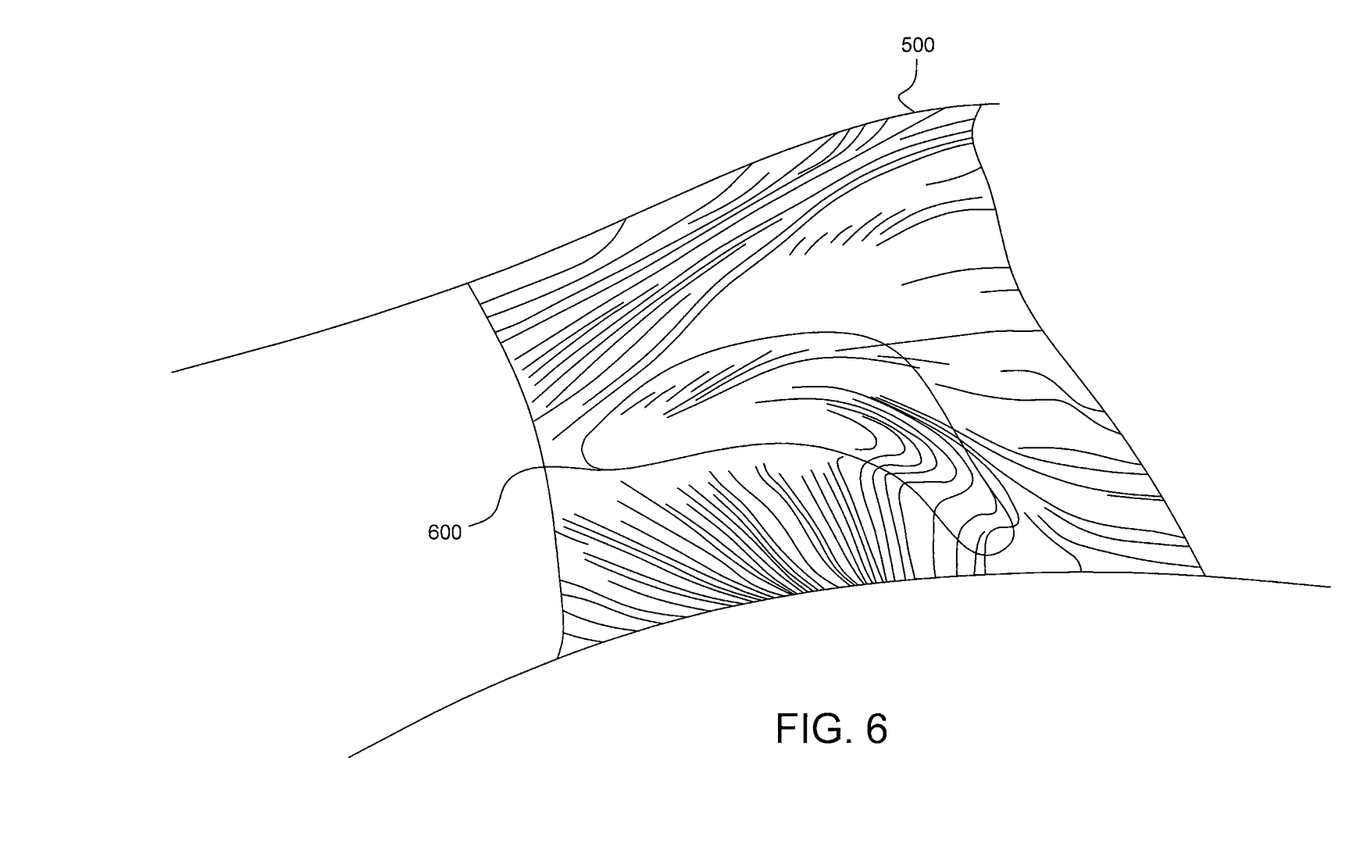
FIG. 6 is an illustration of momentum distribution on a vane.

The axial velocity contour on the suction surface 104 of the ESS vane 500 is presented in FIG. 6 and describes the lower momentum region caused by boundary layer separation, without the addition of the boundary layer control described herein. The ESS vane 500 includes an area of low momentum 600 which is a function of the boundary layer separation from the vane 500.

The slots 501 and 502 across the vane 500 act as fluid diodes to prevent boundary layer detachment and promote boundary layer reattachment to the suction surface 104 by adjusting the amount of flow from the pressure side 102 across various engine operational conditions. The slots 501 and 502 are configured to offer the lowest possible resistance to inflow from the pressure side 102 and the largest possible resistance to backflow from the suction side 104 in order to emulate a non-return valve or check valve.

The characteristics of the slots 501 and 502 (or channels), such as discharge coefficient and delta static pressure across the vane are tuned by design of slot passages under various engine operating conditions.

As shown in FIG. 5b, the slots 501 and 502 each have openings 551 on the pressure side 102 and exits 552 on the suction side 104. The openings 551 are connected to the exits 552 via passages 553. As described previously, these passages 553, openings 551 and exits 552 are preferably shaped to encourage flow from the pressure side 102 to the suction side 104 while discouraging the opposite. One arrangement envisioned is to design the opening 551 to have an area greater than the exit 552. In operation, the slots 501 and 502 are designed to have a pressure gradient between the pressure surface 102 and the suction surface 104. The gradient is determined based on location of openings and exits as well as the shape of the passage. As shown in FIG. 5a, the slot 501 is located on the bottom third of vane span which corresponds to an area of low momentum 600.

The exits 552 may be oval, round or polygonal. Typically the separation of the flow, while local, will be oriented parallel to the span and thus it is envisioned that the forward portion of the exits 552 would be parallel to the span and/or perpendicular to the local flow.

The adjacent ridge 530 may be installed to promote a turbulent boundary layer, more resilient to flow separation compared with less turbulent/laminar boundary layers. The ridge 530 is preferably upstream and adjacent a slot(s) exit(s).

The passages 553 are also preferably shaped to accelerate the flow at the exits 552 thus provide more momentum to the suction side 104 flow to discourage separation of the flow from the suction surface 104.

Adjacent ridges 530, or surface interruptions are envisioned to take multiple forms, for example ramps, recessed grooves, blades, blocks, tabs, protrusions, abrasive surfaces, flaps, etc. which can trip the flow about the suction side 104 from laminar to turbulent. Furthermore, the adjacent ridge 530 while shown as perpendicular to the flow and extending along principally the span of the vane 500, may also be oblique to the flow or have an irregular shape. While it is envisioned that multiple ridges 530 may be employed, typically only one is required per span portion. For example, a second ridge would be unlikely to provide additional benefit directly downstream and at the same span as a first ridge since the flow would have already been tripped.

The ridges 530 or other types of interruptions described above may be also arranged in complimentary pairs.

While one or more embodiments of the present disclosure may describe the placement of the slots just fore and aft of mid chord on a suction side 104, the present embodiments are not so limited. Further, the slots 501, 502 may be located at any intermediate position located between the leading and trailing edges of on the suction surface 104 where the flow suffers from low momentum. For example, a slot may be located at ⅕, ¼, ⅓, ½, ⅔, ¾, or ⅘ of the distance between the leading edge and mid chord, mid (half) chord and the trailing edge, the leading edge and trailing edge, or at some other location along the chord of the blade as required to prevent flow separation.

While preferred embodiments of the present disclosure have been described, it is to be understood that the embodiments described are illustrative only and that the scope of the disclosure is to be defined solely by the appended claims when accorded a full range of equivalence, many variations and modifications naturally occurring to those of skill in the art from a perusal hereof.

I claim:

1. A turbofan comprising:
   a inlet passage;
   a fan in the inlet passage, the inlet passage separating into a bypass passage and core passage downstream of the fan;
   the core passage having an entrance proximate to the fan and an outlet downstream of a compressor;
   an entrance stator located within the core passage aft of the entrance and forward of the compressor; the entrance stator fixed to an inner casing and an outer casing, the entrance stator extending radially between the inner and outer casing; the outer casing separating the bypass passage from the core passage;
   the entrance stator having an airfoil shape with a leading edge and a trailing edge connected by surfaces which define a suction side and a pressure side;
   the entrance stator having a channel with an opening on the pressure side, the channel extending from the opening to an exit on the suction side, wherein there is a pressure gradient between the opening and the exit, wherein the pressure gradient ensures flow from the opening on the pressure side to the exit on the suction side.

2. The turbofan according to claim 1, wherein the exit of the channel is located proximate the inner casing and wherein the inner and outer casing are co-axial.

3. The turbofan according to claim 1, wherein the exit of the channel extends radially from the inner casing to less than a third of the stator span.

4. The turbofan according to claim 1, wherein the exit of the channel is located forward of a half chord of the entrance stator.

5. The turbofan according to claim 1, wherein the exit of the channel is located aft of the half chord of the entrance stator.

6. The turbofan according to claim 1, further comprising a ridge located on the surface of the suction side of the entrance stator, adjacent and forward of the channel exit, the ridge extending into the core passage.

7. The turbofan according to claim 1, wherein the entrance stator comprises a second channel, the second channel with a second opening on the pressure side and a second exit on the suction side.

8. The turbofan according to claim 1, wherein the exit is polygonal with at least one side perpendicular to a predetermined flow proximate to the exit.

9. The turbofan according to claim 1, where the size of the opening is greater than the exit.

10. In a turbofan with a plurality of stators between a fan and a rotor of a compressor, wherein the fan and compressor rotor are coaxial, each stator having a leading edge, trailing edge, suction surface and pressure surface, the suction and pressure surfaces extending between the leading and trailing edge; a method of increasing the efficiency of the compressor comprising:
   injecting high pressure air from the pressure surface via a passage between the pressure surface and the suction surface into a boundary layer on the suction surface,
   restricting the flow of fluid from the suction surface through the passage towards the pressure surface;
   tripping the fluid flow proximate a boundary layer on the suction surface from laminar to turbulent on the suction surface upstream of the injected high pressure air, thereby increasing the efficiency of the compressor.

11. The method according to claim 10, further comprising exposing the passage to the high pressure fluid proximate the surface forward of a half chord of each of the plurality of stators.

12. The method according to claim 10, wherein the passage exits the suction surface aft of the half chord of the stator.

13. The method according to claim 10, wherein the step of tripping the air flow comprises positioning a ridge on the suction surface of each stator forward of the passage and extending the ridge into the air flow.

14. The method according to claim 10, wherein the passage comprises multiple passages.

15. The method according to claim 10, further comprising positioning the passage's exit proximate to a predetermined fluid flow detachment region on the suction surface.

16. The method according to claim 15, further comprising positioning the passage on the pressure surface at a region where the fluid proximate the region creates a pressure gradient to drive the fluid to the suction surface.

17. A stator vane comprising:
a leading edge, trailing edge, a first surface from the leading edge to the trailing edge and a second surface oppositely disposed from the first surface extending from the trailing edge to the leading edge in the shape of an aerofoil;
a one-way channel with an opening on the first surface, the one-way channel extending from the opening to an exit on the second surface,
a pressure gradient between the opening and the exit of the one-way channel; and,
a ridge extending from the second surface forward of the exit, proximate to the opening and the exit;
wherein the first surface is in fluid communication via the one-way channel with the second surface, and wherein the pressure gradient ensures flow from the opening on the pressure side to the exit on the suction side.

18. The stator vane according to claim 17, wherein the exit is polygonal and at least one of the sides extends along the span of the vane.

19. The stator vane according to claim 17, further comprising a second one-way channel with a second opening on the first side, the second one-way channel extending from the second opening to a second exit on the second surface.

20. The stator vane according to claim 17, wherein first and second exits are positioned in an area predetermined to have low momentum flow.

* * * * *